United States Patent
Hu et al.

(10) Patent No.: US 10,104,397 B2
(45) Date of Patent: Oct. 16, 2018

(54) VIDEO PROCESSING APPARATUS FOR STORING PARTIAL RECONSTRUCTED PIXEL DATA IN STORAGE DEVICE FOR USE IN INTRA PREDICTION AND RELATED VIDEO PROCESSING METHOD

(71) Applicant: MEDIATEK INC., Hsin-Chu (TW)

(72) Inventors: Meng-Jye Hu, Taoyuan (TW); Yung-Chang Chang, New Taipei (TW); Chia-Yun Cheng, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 229 days.

(21) Appl. No.: 14/716,904

(22) Filed: May 20, 2015

(65) Prior Publication Data

US 2015/0350673 A1 Dec. 3, 2015

Related U.S. Application Data

(60) Provisional application No. 62/003,612, filed on May 28, 2014.

(51) Int. Cl.
*H04N 19/593* (2014.01)
*H04N 19/51* (2014.01)
(Continued)

(52) U.S. Cl.
CPC ......... *H04N 19/593* (2014.11); *H04N 19/423* (2014.11); *H04N 19/44* (2014.11);
(Continued)

(58) Field of Classification Search
CPC .............................. H04N 19/593; H04N 19/44
(Continued)

(56) References Cited

U.S. PATENT DOCUMENTS

| | | | | |
|---|---|---|---|---|
| RE41,383 E | * | 6/2010 | Lee | ........................ H04N 19/563 375/240 |
| 8,983,218 B2 | * | 3/2015 | Budagavi | .................. G06T 9/00 382/239 |

(Continued)

FOREIGN PATENT DOCUMENTS

| | | |
|---|---|---|
| CN | 1527611 A | 9/2004 |
| CN | 1929612 A | 3/2007 |

(Continued)

OTHER PUBLICATIONS

High efficient sprite cosing with directional spatial prediction; Lu et al; 2002.*

(Continued)

*Primary Examiner* — Luis Perez Fuentes
(74) *Attorney, Agent, or Firm* — Winston Hsu

(57) ABSTRACT

A video processing apparatus includes a reconstruct circuit, a storage device, and an intra prediction circuit. The reconstruct circuit generates reconstructed pixels of a first block of a picture. The storage device at least stores a portion of the reconstructed pixels of the first block, wherein a capacity of the storage device is smaller than a reconstructed data size of the picture. The intra prediction circuit performs intra prediction of a second block of the picture based at least partly on pixel data obtained from the storage device.

18 Claims, 10 Drawing Sheets

(51) Int. Cl.
*H04N 19/55* (2014.01)
*H04N 19/563* (2014.01)
*H04N 19/44* (2014.01)
*H04N 19/423* (2014.01)

(52) U.S. Cl.
CPC ............ *H04N 19/51* (2014.11); *H04N 19/55* (2014.11); *H04N 19/563* (2014.11)

(58) Field of Classification Search
USPC .................................................... 375/240.12
See application file for complete search history.

(56) References Cited

U.S. PATENT DOCUMENTS

| | | | | |
|---|---|---|---|---|
| 9,083,983 | B2* | 7/2015 | Coban | H04N 19/563 |
| 9,137,545 | B2* | 9/2015 | Song | H04N 19/176 |
| 9,525,884 | B2* | 12/2016 | Huang | H04N 19/117 |
| 2006/0171685 | A1 | 8/2006 | Chen | |
| 2008/0260023 | A1* | 10/2008 | Sung | H04N 19/428 375/240.03 |
| 2011/0122950 | A1* | 5/2011 | Ji | H04N 19/563 375/240.16 |
| 2013/0044809 | A1* | 2/2013 | Chong | H04N 19/647 375/240.03 |
| 2013/0272624 | A1 | 10/2013 | Budagavi | |
| 2014/0092957 | A1* | 4/2014 | MacInnis | H04N 19/61 375/240.02 |
| 2014/0269913 | A1* | 9/2014 | Lee | H04N 19/00266 375/240.12 |
| 2015/0003518 | A1* | 1/2015 | Nguyen | H04N 19/126 375/240.03 |
| 2015/0071357 | A1* | 3/2015 | Pang | H04N 19/593 375/240.16 |
| 2015/0264348 | A1* | 9/2015 | Zou | H04N 19/593 375/240.02 |
| 2015/0326886 | A1* | 11/2015 | Chen | H04N 19/61 375/240.02 |
| 2015/0334425 | A1* | 11/2015 | He | H04N 19/91 375/240.03 |

FOREIGN PATENT DOCUMENTS

| | | |
|---|---|---|
| CN | 101563927 A | 10/2009 |
| CN | 101710990 A | 5/2010 |
| CN | 103238318 A | 8/2013 |
| CN | 103621095 A | 3/2014 |

OTHER PUBLICATIONS

"International Search Report" dated Sep. 6, 2015 for International application No. PCT/CN2015/080006, International filing date: May 28, 2015.

* cited by examiner

VIDEO PROCESSING APPARATUS FOR STORING PARTIAL RECONSTRUCTED PIXEL DATA IN STORAGE DEVICE FOR USE IN INTRA PREDICTION AND RELATED VIDEO PROCESSING METHOD

CROSS REFERENCE TO RELATED APPLICATIONS

This application claims the benefit of U.S. provisional application No. 62/003,612, filed on May 28, 2014 and incorporated herein by reference.

BACKGROUND

The present invention relates to video processing (e.g., video decoding), and more particularly, to a video processing apparatus for storing partial reconstructed pixel data in a storage device for use in intra prediction and a related video processing method.

The conventional video coding standards generally adopt a block based coding technique to exploit spatial and temporal redundancy. For example, the basic approach is to divide the whole source picture into a plurality of blocks, perform intra/inter prediction on each block, transform residues of each block, and perform quantization and entropy encoding. Besides, a reconstructed picture is generated in a coding loop to provide reference pixel data used for coding following blocks. For certain video coding standards, in-loop filter(s) maybe used for enhancing the image quality of the reconstructed frame.

The video decoder is used to perform an inverse operation of a video encoding operation performed by a video encoder. For example, the video decoder also has an intra prediction unit used to generate predicted pixels needed for generating a reconstructed frame serving as a reference frame. For certain video coding standards, the intra prediction of a current block being decoded requires reconstructed pixels of previously decoded block(s). However, using a picture buffer with a capacity not smaller than a reconstructed data size of one picture for buffering each reconstructed pixel generated from a reconstruct unit is not cost-efficient. Hence, there is a need for an innovative low-cost video decoder design which can use a small-sized buffer for buffering reconstructed pixels needed by intra prediction of one block to be decoded.

SUMMARY

One of the objectives of the claimed invention is to provide a video processing apparatus for storing partial reconstructed pixel data in a storage device for use in intra prediction and a related video processing method.

According to a first aspect of the present invention, an exemplary video processing apparatus is disclosed. The exemplary video processing apparatus includes a reconstruct circuit, a storage device, and an intra prediction circuit. The reconstruct circuit is arranged to generate reconstructed pixels of a first block of a picture. The storage device is arranged to at least store a portion of the reconstructed pixels of the first block, wherein a capacity of the storage device is smaller than a reconstructed data size of the picture. The intra prediction circuit is arranged to perform intra prediction of a second block of the picture based at least partly on pixel data obtained from the storage device.

According to a second aspect of the present invention, an exemplary video processing method is disclosed. The exemplary video processing method includes: generating reconstructed pixels of a first block of a picture; utilizing a storage device to at least store a portion of the reconstructed pixels of the first block, wherein a capacity of the storage device is smaller than a reconstructed data size of the picture; and performing intra prediction of a second block of the picture based at least partly on pixel data obtained from the storage device.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
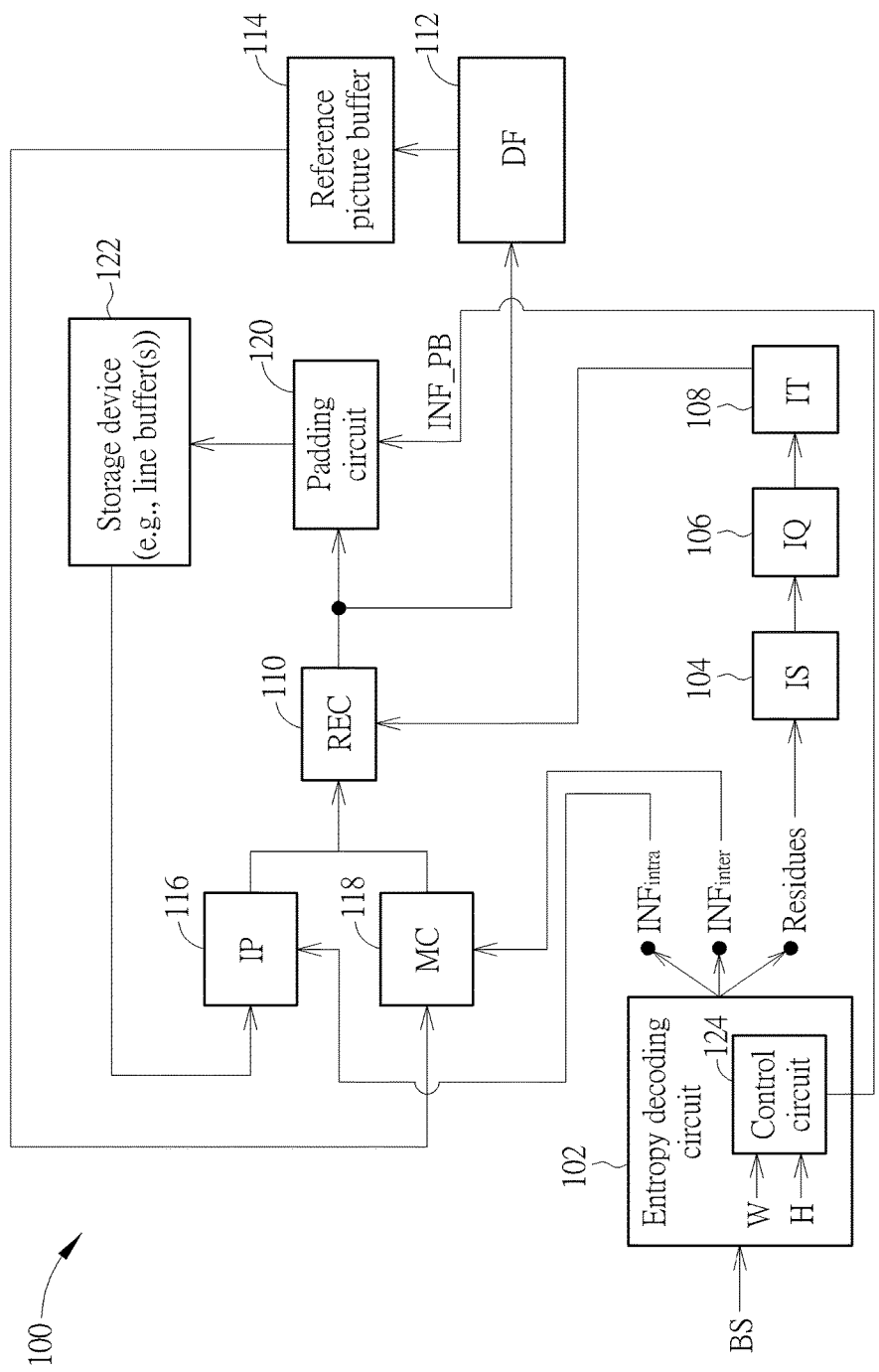
FIG. 1 is a diagram of a first video processing apparatus according to an embodiment of the present invention.

FIG. 1 is a diagram of a video processing apparatus according to a first embodiment of the present invention. The video processing apparatus 100 may be part of an electronic device, such as a personal computer (e.g., a laptop computer or a desktop computer), a mobile phone, a tablet, or a wearable device. The video processing apparatus 100 may include at least a portion (i.e., part or all) of a video decoder for decoding a bitstream BS to generate a video sequence composed of a plurality of consecutive decoded pictures (i.e., reconstructed pictures). At least a portion of the video processing apparatus 100 may be implemented in an integrated circuit (IC). To put it simply, any electronic device or electronic system using the proposed video processing apparatus 100 falls within the scope of the present invention.

As shown in FIG. 1, the video processing apparatus (e.g., video decoder) 100 includes an entropy decoding circuit 102, an inverse scan circuit (denoted as "IS") 104, an inverse quantization circuit (denoted as "IQ") 106, an inverse transform circuit (denoted as "IT") 108, a reconstruct circuit (denoted as "REC") 110, at least one in-loop filter (e.g., a de-blocking filter (DF) 112), a reference picture buffer 114, an intra prediction circuit (denoted as "IP") 116, a motion compensation circuit (denoted as "MC") 118, a padding circuit 120, and a storage device (e.g., line buffer (s)) 122. The reference picture buffer 114 may be an external storage device such as an off-chip dynamic random access memory (DRAM), and the storage device 122 may be an internal storage device such as an on-chip static random access memory (SRAM). By way of example, but not limitation, the video processing apparatus 100 maybe used to decode the incoming bitstream BS generated using a VP9 coding standard that is an open and royalty-free video coding standard being developed by Google®. However, this is for illustrative purposes only, and is not meant to be a limitation of the present invention. Any video decoder using the proposed video decoder structure falls within the scope of the present invention.

The entropy decoding circuit 102 is arranged to apply entropy decoding to the incoming bitstream BS for generating intra mode information $INF_{intra}$, inter mode information $INF_{inter}$, and residues. The residues are transmitted to the reconstruct circuit 110 through being inverse scanned (which is performed at the inverse scan circuit 104), inverse quantized (which is performed at the inverse quantization circuit 106), and inverse transformed (which is performed at the inverse transform circuit 108). When a block in an original picture is encoded using an intra prediction mode, the intra prediction circuit 116 is enabled to generate predicted pixels/samples to the reconstruct circuit 110. When the block in the original picture is encoded using an inter prediction mode, the motion compensation circuit 118 is enabled to generate predicted pixels/samples to the reconstruct circuit 110. The reconstruct circuit 110 is arranged to combine a residue output of the inverse transform circuit 108 and a predicted pixel output of one of intra prediction circuit 116 and motion compensation circuit 118 to thereby generate reconstructed pixels/samples of each block of a picture (i.e., a reconstructed/decoded picture). The de-blocking filter 112 is arranged to apply de-blocking filtering to the reconstructed picture generated from the reconstruct circuit 110, and then generate a de-blocked picture as a reference picture. The reference picture is stored into the reference picture buffer 114, and may be referenced by the motion compensation circuit 118 to generate predicted pixels/samples.

VP9 divides one picture into 64×64-sized blocks that are called superblocks $SB_{64\times64}$. Superblocks $SB_{64\times64}$ of the picture are processed in raster order: left to right, top to bottom. In addition, VP9 supports quad-tree based encoding. Hence, recursive partitioning may be employed to split each superblock $SB_{64\times64}$ into one or more partitions (e.g., smaller-sized superblocks) for further processing. For example, one superblock $SB_{64\times64}$ with the superblock size of 64×64 may be split into one or more coding units (or called mode information (MI) units), where the partitions supported by VP9 coding standard may include square partitions, such as a 64×64-sized block, a 32×32-sized block, a 16×16-sized block, a 8×8-sized block, and may further include non-square partitions, such as a 64×32-sized block, a 32×64-sized block, 32×16-sized block, a 16×32-sized block, ..., a 8×8-sized block. Hence, the coding unit (MI unit) sizes may include 64×64, 32×32, 16×16, 8×8, 64×32, 32×64, 32×16, 16×32, ..., 8×8. Each of the coding units (MI units) may be further split into one or more transform blocks, each having a transform unit (TU) size selected from a group consisted of 32×32, 16×16, 8×8 and 4×4.

Intra prediction in VP9 follows the transform block partitions. In other words, intra prediction may be performed at 4 different scales (i.e., 4×4, 8×8, 16×16 and 32×32) determined by the TU size used. Thus, intra prediction operations are applied to square transform blocks. For example, one 16×8 block with 8×8 transforms will result in two 8×8 intra prediction operations. VP9 uses a total of 10 different intra prediction options, including H_PRED (horizontal prediction), V_PRED (vertical prediction), DC_PRED (DC prediction), TM_PRED (TrueMotion prediction), and 6 angular prediction modes. Like other coding standards, VP9's intra prediction of a current block requires two one-dimensional arrays that contain the left reconstructed pixels and the above reconstructed pixels belonging to the neighbor blocks.

Figure 2:
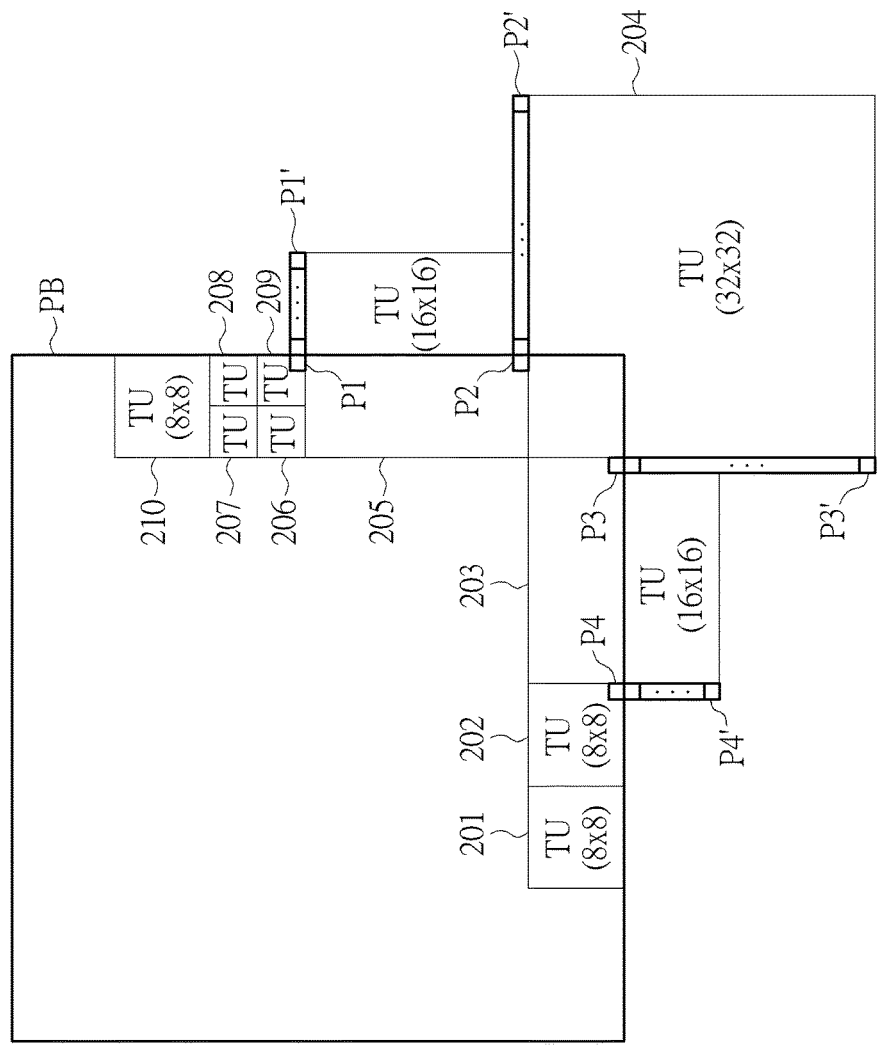
FIG. 2 is a diagram illustrating a pixel padding example.

However, in accordance with the VP9 coding standard, there is no limitation to intra prediction at the picture boundary. Hence, all of the TU sizes 4×4, 8×8, 16×16 and 32×32 are allowed at the picture boundary. The picture boundary may be equal to the display boundary extending to the nearest value that is a multiple of 8. There is a need to perform pixel padding at the picture boundary before doing the intra prediction operation. FIG. 2 is a diagram illustrating a pixel padding example. The transform blocks 206-209 have the same TU size of 4×4. The transform blocks 201, 202 and 210 have the same TU size of 8×8. The transform blocks 203 and 205 have the same TU size of 16×16. The transform block 204 has the TU size of 32×32. The transform blocks 201, 202, 208, 209 and 210 are on the picture boundary PB, while the transform blocks 203, 204, and 205 are across the picture boundary PB. As mentioned above, VP9's intra prediction of a current block requires two one-dimensional arrays that contain the left reconstructed pixels and the above reconstructed pixels belonging to the neighbor blocks. With regard to the transform block 205 that is across the picture boundary PB, a portion of an above array of reconstructed pixels is not available. Hence, the reconstructed boundary pixel P1 on the picture boundary PB is copied to form a plurality of padded pixels P1' outside the picture boundary PB, where the reconstructed boundary pixel P1 and the padded pixels P1' correspond to the same row.

With regard to the transform block 204 that is across the picture boundary PB, a portion of an above array of reconstructed pixels is not available, and a portion of a left array of reconstructed pixels is not available. Hence, the reconstructed boundary pixel P2 on the picture boundary PB is copied to form a plurality of padded pixels P2' outside the picture boundary PB, where the reconstructed boundary pixel P2 and the padded pixels P2' correspond to the same row. In addition, the reconstructed boundary pixel P3 on the picture boundary PB is copied to form a plurality of padded pixels P3' outside the picture boundary PB, where the reconstructed boundary pixel P3 and the padded pixels P3' correspond to the same column.

With regard to the transform block 203 that is across the picture boundary PB, a portion of a left array of reconstructed pixels is not available. Hence, the reconstructed boundary pixel P4 on the picture boundary PB is copied to form a plurality of padded pixels P4' outside the picture boundary PB, where the reconstructed boundary pixel P4 and the padded pixels P4' correspond to the same column.

In this embodiment, the padding circuit 120 is arranged to perform pixel padding on the picture boundary when a block to be decoded is across the picture boundary PB (i.e., partially inside the picture boundary PB). For example, the reconstruct circuit 110 generates reconstructed pixels of a first block (e.g., transform block 202 or transform block 209) of a picture, wherein the reconstructed pixels include a reconstructed boundary pixel (e.g., P4 or P1) on a picture boundary of the picture. Hence, the padding circuit 120 generates at least one padded pixel (e.g., P4' or P1') outside the picture boundary, wherein the reconstructed boundary pixel and the at least one padded pixel correspond to the same row of the picture or the same column of the picture. In addition, the padding circuit 120 stores a portion of the reconstructed pixels of the first block (e.g., the right-most reconstructed pixel column of the transform block 202, including the reconstructed boundary pixel P4; or the bottom-most reconstructed pixel row of the transform block 209, including the reconstructed boundary pixel P1) and the at least one padded pixel (e.g., P4' or P1') into the storage device 122. It should be noted that two one-dimensional arrays (which contain the left reconstructed pixels and the above reconstructed pixels belonging to neighbor blocks decoded prior to a current block) may be both stored in the storage device 122 for use in intra prediction of the current block.

The intra prediction circuit 116 performs intra prediction of a second block (e.g., transform block 203 or transform block 205) of the picture based at least partly on pixel data obtained from the storage device 122, such as the portion of the reconstructed pixels (e.g., the right-most reconstructed pixel column of the transform block 202, including the reconstructed boundary pixel P4; or the bottom-most reconstructed pixel row of the transform block 209, including the reconstructed boundary pixel P1) and the associated at least one padded pixel (e.g., P4' or P1'). The first block (e.g., a current block being decoded) and the second block (e.g., a later block to be decoded) may be vertically adjacent to each other. That is, the first block may be located above the second block. In one example, the first block and the second block may belong to the same coding unit (MI unit), and may have the same TU size. In another example, the first block and the second block may belong to different coding units (MI units), and have the same TU size or different TU size.

It should be noted that the storage device 122 can be reused during decoding of one picture. In other words, during decoding of the picture, at least a portion of the pixel data stored in the storage device 122 can be overwritten or discarded. In this way, old pixel data, including reconstructed pixel data and/or padded data, stored in the storage device 122 due to previous decoded block(s) but no longer required by intra prediction of later block(s) to be decoded can be replaced/overwritten with new pixel data, including reconstructed pixel data and/or padded data, required for intra prediction of later block(s) to be decoded. Since the storage device 122 does not need to store a full reconstructed picture, the capacity of the storage device 122 (i.e., a buffer size) is smaller than a reconstructed data size of the picture. Compared to a picture buffer implemented using a large-sized DRAM, the storage device 122 may be implemented using a small-sized SRAM. In this way, the proposed video processing apparatus 100 has advantages for intra prediction implementation, such as shorter memory access latency and/or lower production cost.

When the reconstruct circuit 110 generates reconstructed pixels of a current decoded block of a picture and no pixel padding is needed for providing padded pixel(s) that may be required by intra prediction of a later block to be decoded, the storage device 122 stores a portion of the reconstructed pixels of the current decoded block (e.g., a right-most reconstructed pixel column or a bottom-most reconstructed pixel row of the current decoded block). When the reconstruct circuit 110 generates reconstructed pixels of a current decoded block of a picture and the padding circuit 120 is enabled to generate padded pixel(s) that may be required by intra prediction of a later block to be decoded, the storage device 122 stores a portion of the reconstructed pixels of the current decoded block (e.g., a right-most reconstructed pixel column or a bottom-most reconstructed pixel row of the current decoded block) and the associated padded pixel(s). Further, during decoding of one picture, pixel data stored in the storage device 122 for intra prediction of one block of the picture can be replaced by new pixel data for intra prediction of a different block in the same picture.

Figure 3:
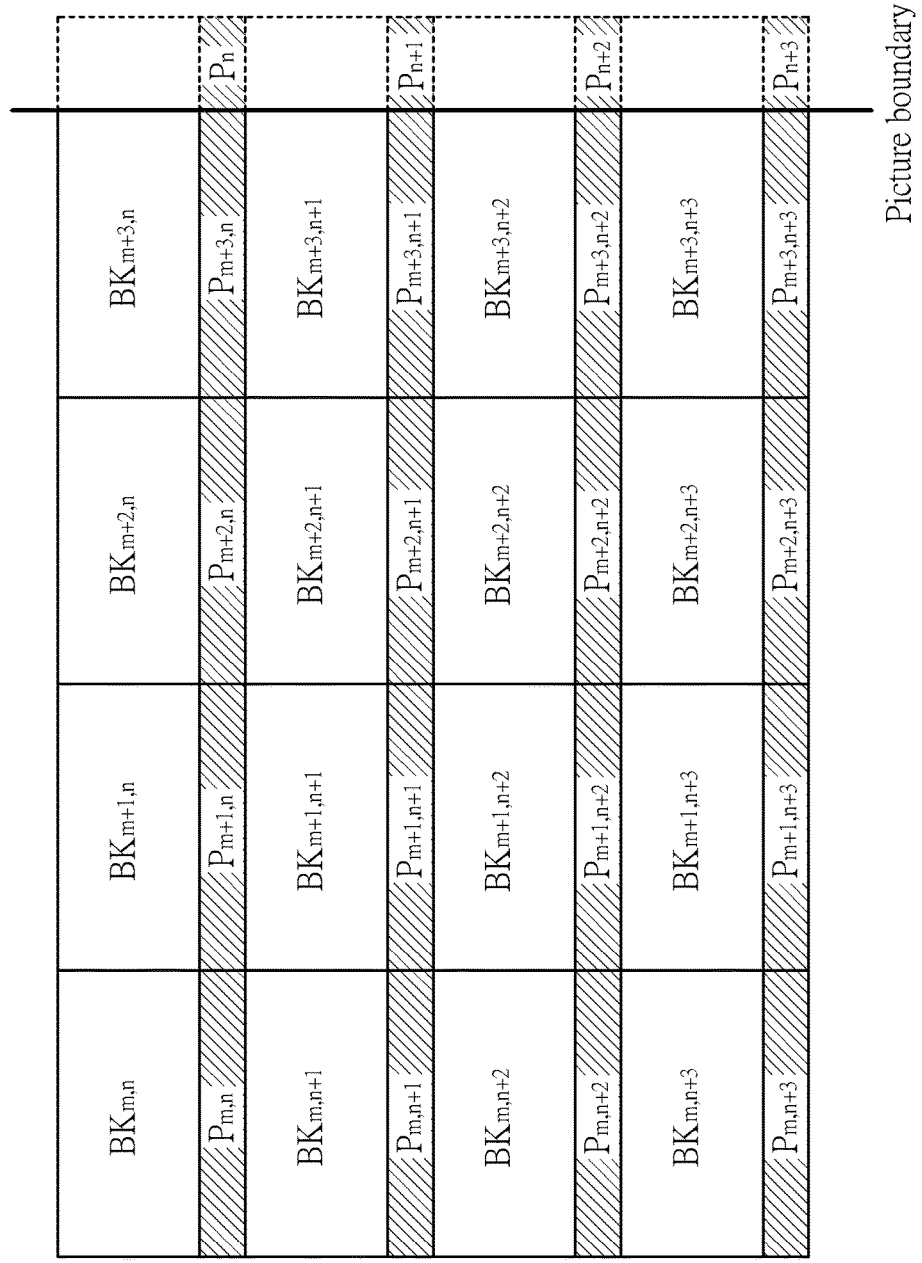
FIG. 3 is a diagram illustrating a portion of a picture processed by a video processing apparatus according to an embodiment of the present invention.
Figure 4:
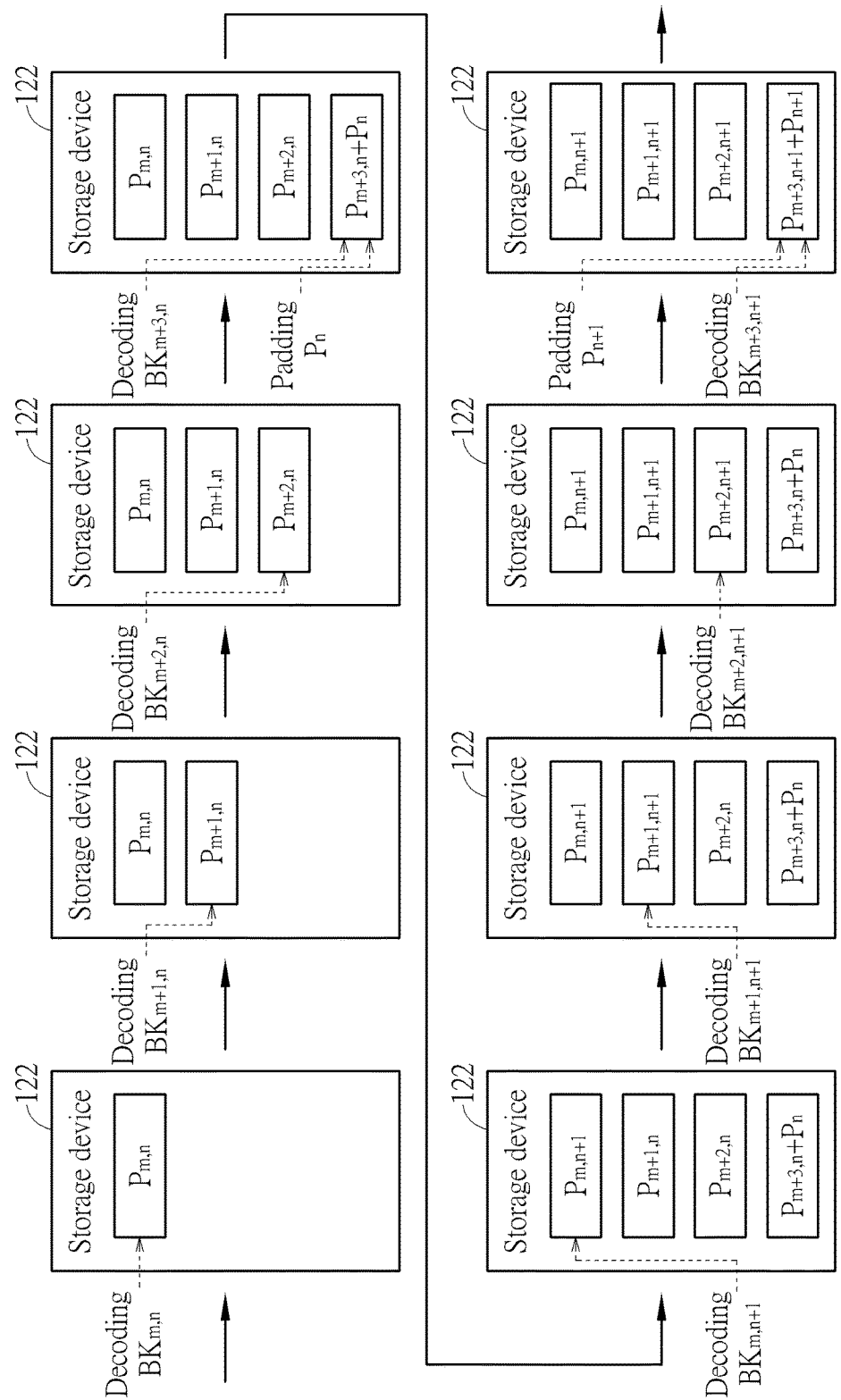
FIG. 4 is a diagram illustrating an example of using a storage device shown in FIG. 1 to store pixel data of reconstructed pixels and/or padded pixels.

Please refer to FIG. 3 in conjunction with FIG. 4. FIG. 3 is a diagram illustrating a portion of a picture processed by a video processing apparatus according to an embodiment of the present invention. FIG. 4 is a diagram illustrating an example of using the storage device 122 to store pixel data of reconstructed pixels and/or padded pixels. A portion of a picture decoded by the video processing apparatus (e.g., video decoder) 100 may include blocks (e.g., transform blocks) $BK_{m,n}$-$BK_{m+3,n+3}$. With regard to each of the blocks $BK_{m+3,n}$, $BK_{m+3,n+1}$, $BK_{m+3,\ n+2}$, and $BK_{m+3,\ n+3}$, intra prediction is performed across the picture boundary. Suppose that the blocks $BK_{m,n}$-$BK_{m+3,n+3}$ are decoded in a raster scan order. When decoding of the block $BK_{m,n}$ is complete, the pixel data of the bottom-most reconstructed pixel row $P_{m,n}$ may be stored into the storage device 122 since intra prediction of the block $BK_{m,n+1}$ (which is directly below the block $BK_{m,n}$) may need the bottom-most reconstructed pixel row $P_{m,n}$. Since the block $BK_{m,n+1}$ is fully inside the picture boundary, there is no need to perform pixel padding based on a right-most reconstructed pixel in the bottom-most reconstructed pixel row $P_{m,n}$. Similarly, the pixel data of the bottom-most reconstructed pixel row $P_{m+1,n}$ is stored into the storage device 122 when decoding of the block $BK_{m+1,n}$ is complete, and the pixel data of the bottom-most reconstructed pixel row $P_{m+2,n}$ is stored into the storage device 122 when decoding of the block $BK_{m+2,n}$ is complete.

When decoding of the block $BK_{m+3,n}$ is complete, the pixel data of the bottom-most reconstructed pixel row $P_{m+3,n}$ is stored into the storage device 122 since intra prediction of the block $BK_{m+3,n+1}$ (which is directly below the block $BK_{m+3,n}$) may need the bottom-most reconstructed pixel row $P_{m+3,n}$. Since intra prediction of the block $BK_{m+3,n+1}$ is across the picture boundary, the padding circuit 120 is operative to generate a padded pixel row $P_n$ based on a right-most reconstructed pixel (i.e., a reconstructed boundary pixel) in the bottom-most reconstructed pixel row $P_{m+3,n}$, and store the padded pixel row $P_n$ into the storage device 122.

When decoding of the block $BK_{m,n+1}$ begins, the neighbor pixel data needed for intra prediction of the block $BK_{m,n+1}$ is already available in the storage device 122. In this example, the upper one-dimensional array of reconstructed pixel data (i.e., the bottom reconstructed pixel row $P_{m,n}$) can be directly obtained from the storage device 122. When decoding of the block $BK_{m,n+1}$ is complete, the bottom reconstructed pixel row $P_{m,n}$ is no longer needed by any later block to be decoded. Hence, the pixel data of the bottom-most reconstructed pixel row $P_{m,n+1}$ may be stored into the storage device 122 to overwrite the useless bottom reconstructed pixel row $P_{m,n}$, where intra prediction of the block $BK_{m,n+2}$ (which is directly below the block $BK_{m,n+1}$) may need the bottom-most reconstructed pixel row $P_{m,n+1}$. Since the block $BK_{m,n+2}$ is fully inside the picture boundary, there is no need to perform pixel padding based on a right-most reconstructed pixel in the bottom-most reconstructed pixel row $P_{m,n+1}$. Similarly, the pixel data of the bottom-most reconstructed pixel row $P_{m+1,n+1}$ may be stored into the storage device 122 to overwrite the useless bottom reconstructed pixel row $P_{m+1,n}$ when decoding of the block $BK_{m+1,n+1}$ is complete, and the pixel data of the bottom-most reconstructed pixel row $P_{m+2,n+1}$ may be stored into the storage device 122 to overwrite the useless bottom reconstructed pixel row $P_{m+2,n}$ when decoding of the block $BK_{m+2,n+1}$ is complete.

When decoding of the block $BK_{m+3,n+1}$ begins, the neighbor pixel data needed for intra prediction of the block $BK_{m+3,n+1}$ is already available in the storage device 122. In this example, the upper one-dimensional array of reconstructed pixel data (i.e., the bottom reconstructed pixel row $P_{m+3,n}$) and associated padded pixel data (i.e., the padded pixel row $P_n$) can be directly obtained from the storage device 122. When decoding of the block $BK_{m+3,n+1}$ is complete, the pixel data of the bottom-most reconstructed pixel row $P_{m+3,n+1}$ is stored into the storage device 122 since intra prediction of the block $BK_{m+3,n+2}$ (which is directly below the block $BK_{m+3,n+1}$) may need the bottom-most reconstructed pixel row $P_{m+3,n+1}$. Since the block $BK_{m+3,n+2}$ is partially inside the picture boundary, the padding circuit 120 is operative to generate a padded pixel row $P_{n+1}$ based on a right-most reconstructed pixel (i.e., a reconstructed boundary pixel) in the bottom-most reconstructed pixel row $P_{m+3,n+1}$, and store the padded pixel row $P_{n+1}$ into the storage device 122. When decoding of the block $BK_{m+3,n+1}$ is complete, the bottom reconstructed pixel row $P_{m+3,n}$ and associated padded pixel row $P_n$ are no longer needed by any later block to be decoded. Hence, the bottom-most reconstructed pixel row $P_{m+3,n+1}$ and associated padded pixel row $P_{n+1}$ may be stored into the storage device 122 to overwrite the useless bottom reconstructed pixel row $P_{m+3,n}$ and associated padded pixel row $P_n$.

As a person skilled in the art can readily understand the operation of using the storage device 122 to store and replace/overwrite reconstructed pixel data and/or padded pixel data used by intra prediction of following blocks after reading above paragraphs, further description is omitted here for brevity.

As mentioned above, the pixel padding is selectively performed by the padding circuit 120 based on whether a transform block is across the picture boundary. In this embodiment, the padding circuit 120 is controlled by picture boundary information INF_PB generated from a control circuit (e.g., a decoder control unit) 124. By way of example, the control circuit 124 may be part of the entropy decoding circuit 102. When the reconstruct circuit 110 generates reconstructed pixels of a first block (e.g., a current decoded block, such as transform block 202 or transform block 209), the control circuit 124 is arranged to generate the picture boundary information INF_PB according to a width of the picture W, a height of the picture H, and position-related information of a second block (e.g., a later block to be decoded, such as transform block 203 or transform block 205), wherein the picture boundary information INF_PB indicates whether the second block is across the picture boundary of the picture. Hence, the padding circuit 120 enables pixel padding to generate padded pixel(s) according to a reconstructed boundary pixel when the picture boundary information INF_PB indicates that the second block is across the picture boundary; and the padding circuit 120 does not enable pixel padding to generate padded pixel(s) according to a reconstructed boundary pixel when the picture boundary information INF_PB indicates that the second block is fully inside the picture boundary.

In one exemplary design, the picture boundary information INF_PB may be implemented using a control flag cross_boundary_flag. For example, the position-related information of the second block (e.g., a later block to be decoded) may include a start X-axis position XL, an end X-axis position XH, a start Y-axis position YL, and an end Y-axis position YH, where XH>XL and YH>YL. Specifically, the upper-left corner of the second block is located at (XL, YH), the upper-right corner of the second block is located at (XH, YH), the bottom-left corner of the second block is located at (XL, YL), and the bottom-right corner of the second block is located at (XH, YL). The picture width W and the picture height H may be parsed from a header section of the incoming bitstream BS. The control circuit 124 sets the control flag cross_boundary_flag according to a cross horizontal boundary flag h_cross_boundary_flag and a cross vertical boundary flag v_cross_boundary_flag. The operation of setting the cross horizontal boundary flag h_cross_boundary_flag may be represented by the following pseudo code.

```
If (XL < W) && (XH > W)
    h_cross_boundary_flag =1
else
    h_cross_boundary_flag=0
```

The operation of setting the cross vertical boundary flag v_cross_boundary_flag may be represented by the following pseudo code.

```
If (YL < H) && (YH > H)
    v_cross_boundary_flag =1
else
    v_cross_boundary_flag=0
```

After the cross horizontal boundary flag h_cross_boundary_flag and the cross vertical boundary flag v_cross_boundary_flag are determined, the control flag cross_boundary_flag may be set by a logic combination of the cross horizontal boundary flag h_cross_boundary_flag and the cross vertical boundary flag v_cross_boundary_flag. For example, the logic combination is an OR logic operation. Hence, the computation of the control flag cross_boundary_flag may be expressed by:

cross_boundary_flag=h_cross_boundary_flag||v_cross_boundary_flag.

It should be noted that the above example is not meant to be a limitation of the present invention. In an alternative design, the control circuit 124 maybe configured to use a different computation algorithm for setting the picture boundary information INF_PB to indicate whether intra prediction of a block is across the picture boundary.

With regard to the video processing apparatus 100, the intra prediction circuit 116 is arranged to generate first predicted pixels of the first block to the reconstruct circuit 110 when the prediction mode of the first block is an intra prediction mode, and the motion compensation circuit 118 is arranged to generate second predicted pixels of the first block to the reconstruct circuit 110 when a prediction mode of the first block is an inter prediction mode. In this embodiment, the reconstruct circuit 110 is implemented using a single reconstruct unit shared between the intra prediction circuit 116 and the motion compensation circuit 118 for selectively performing intra-coded pixel reconstruction based at least partly on the first predicted pixels and performing inter-coded pixel reconstruction based at least partly on the second predicted pixels. Hence, the reconstructed pixels of the first block may be generated based on one of a predicted pixel output of the intra prediction circuit 116 and a predicted pixel output of the motion compensation circuit 118. However, this is for illustrative purposes only, and is not meant to be a limitation of the present invention. Alternatively, the reconstruct circuit 110 shown in FIG. 1 may be modified to have more than one reconstruct unit.

Figure 5:
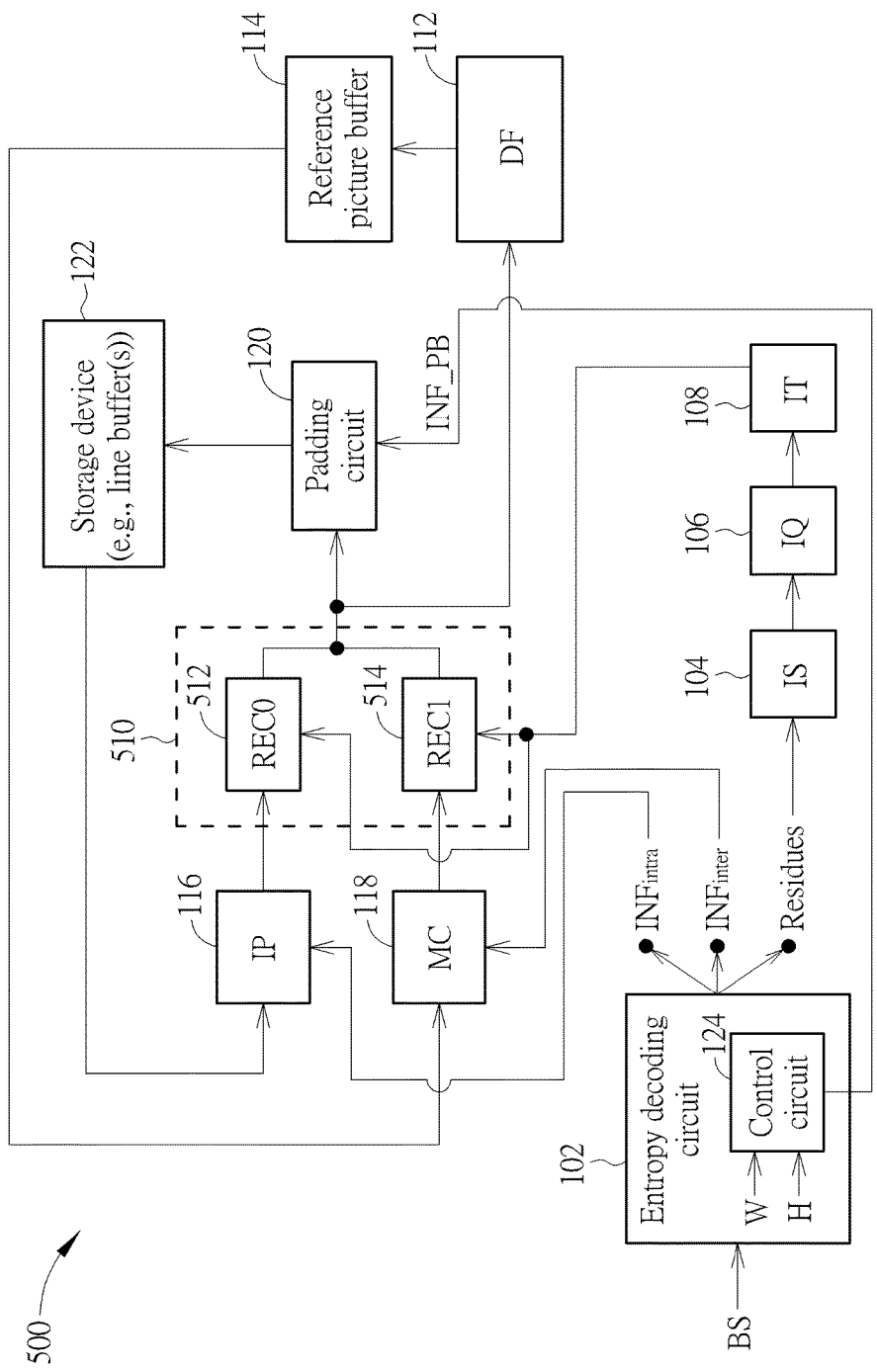
FIG. 5 is a diagram of a second video processing apparatus according to an embodiment of the present invention.

FIG. 5 is a diagram of a second video processing apparatus according to an embodiment of the present invention. The video processing apparatus 500 may be part of an electronic device, such as a personal computer (e.g., a laptop computer or a desktop computer), a mobile phone, a tablet or a wearable device. The video processing apparatus 500 may include at least a portion (i.e., part or all) of a video decoder for decoding a bitstream BS to generate a video sequence composed of a plurality of consecutive decoded pictures (i.e., reconstructed pictures). At least a portion of the video processing apparatus 500 may be implemented in an integrated circuit (IC). To put it simply, any electronic device or electronic system using the proposed video processing apparatus 500 falls within the scope of the present invention. The major difference between the video processing apparatuses 100 and 500 is the reconstruct circuit design. As shown in FIG. 5, the reconstruct circuit 510 includes a first reconstruct unit (denoted by "REC0") 512 and a second reconstruct unit (denoted by "REC1") 514. The intra prediction circuit 116 is arranged to generate first predicted pixels of the first block to the first reconstruct unit 512 when the prediction mode of the first block is an intra prediction mode. The motion compensation circuit 118 is arranged to generate second predicted pixels of the first block to the second reconstruct unit 514 when a prediction mode of the first block is an inter prediction mode. Hence, the first reconstruct unit 512 is dedicated to the intra prediction circuit 116, and the second reconstruct unit 514 is dedicated to the motion compensation circuit 118. Specifically, the intra prediction circuit 116 is coupled to the intra prediction circuit 116 for performing intra-coded pixel reconstruction based at least partly on the first predicted pixels. The second reconstruct unit 514 is coupled to the motion compensation circuit 118 for performing inter-coded pixel reconstruction based at least partly on the second predicted pixels. Hence, the reconstructed pixels of the first block may be generated from one of the first reconstruct unit 512 and the second reconstruct unit 514 to the following circuit components (e.g., padding circuit 120 and storage device 122).

Figure 6:
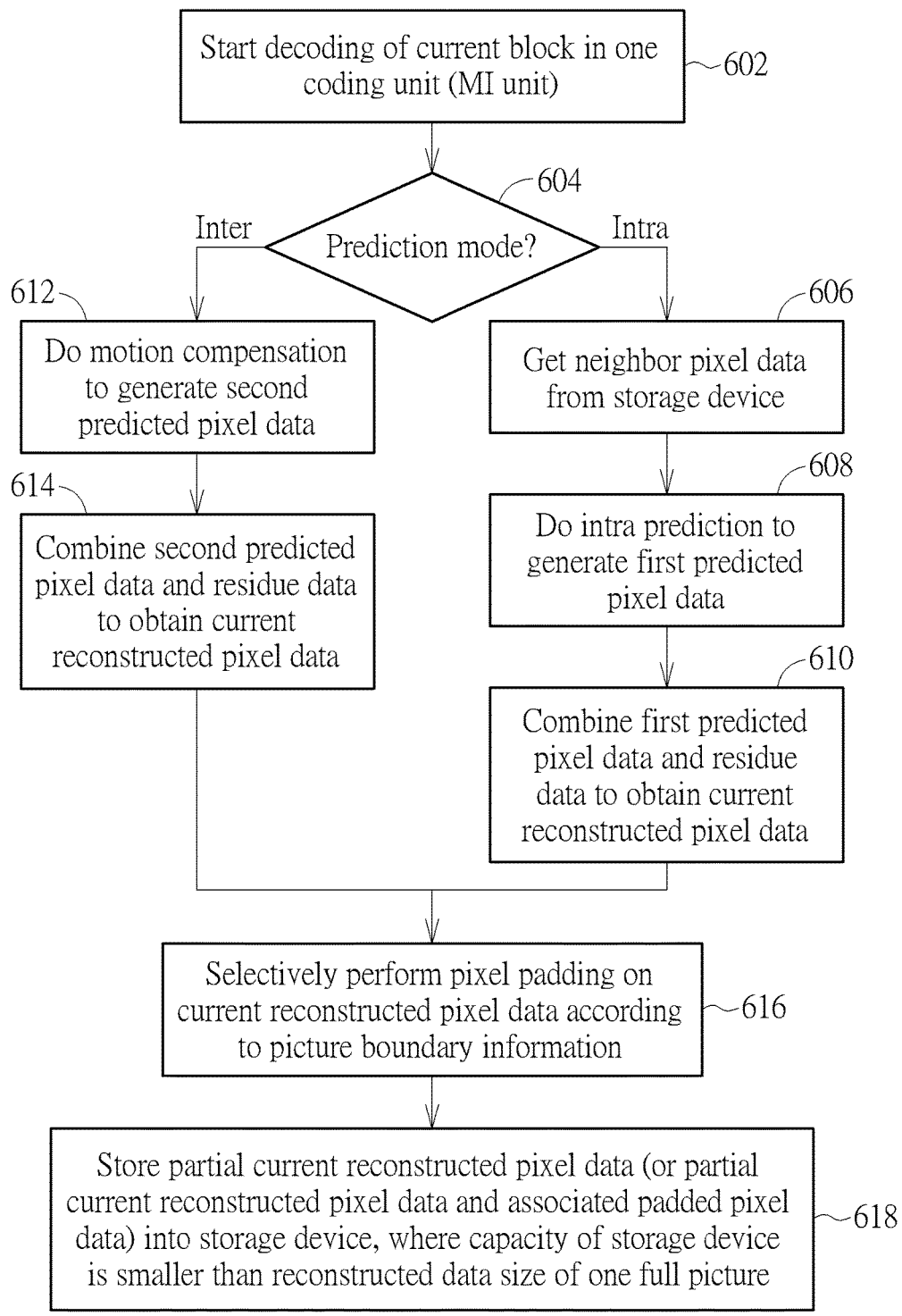
FIG. 6 is a diagram illustrating a first video processing method according to an embodiment of the present invention.

FIG. 6 is a diagram illustrating a first video processing method according to an embodiment of the present invention. Provided that the result is substantially the same, the steps are not required to be executed in the exact order shown in FIG. 6. The video processing method shown in FIG. 6 may be part of a video decoding procedure, and may be employed by any of the video processing apparatuses 100 and 500. The video processing method may be briefly summarized as below.

Step 602: Start decoding of a current block (e.g., a transform block) in one coding unit (MI unit).

Step 604: Check a prediction mode of the current block. When the prediction mode of the current block is the intra prediction mode, go to step 606. When the prediction mode of the current block is the inter prediction mode, go to step 612.

Step 606: Get neighbor pixel data from a storage device (e.g., storage device 122).

Step 608: Do intra prediction to generate first predicted pixel data.

Step 610: Combine the first predicted pixel data and residue data to obtain current reconstructed pixel data. Go to step 616.

Step 612: Do motion compensation to generate second predicted pixel data.

Step 614: Combine the second predicted pixel data and the residue data to obtain current reconstructed pixel data.

Step 616: Selectively perform pixel padding on the current reconstructed pixel data according to picture boundary information.

Step 618: Store partial current reconstructed pixel data (or partial current reconstructed pixel data and associated padded pixel data) into the storage device (e.g., storage device 122), where a capacity of the storage device is smaller than a reconstructed data size of one full picture.

As a person skilled in the pertinent art should readily understand details of each step in FIG. 6 after reading above paragraphs, further description is omitted here for brevity.

In above embodiments shown in FIG. 1 and FIG. 5, the padding circuit 120 is coupled between the reconstruct circuit 110/510 and the storage device 122. Hence, padded pixel data is already available in the storage device 122 before the video processing apparatus 100/500 starts decoding a block that may be across the picture boundary and may need the padded pixel data for intra prediction. In other words, the padding circuit 120 prepares the padded pixel data needed by a later block in advance. In addition, no matter whether the reconstructed pixel data is generated based on the predicted pixel data provided by the intra prediction circuit 116 or based on the predicted pixel data provided by the motion compensation circuit 118, the padding circuit 120 refers to the picture boundary information ING_PB to selectively perform pixel padding on the reconstructed pixel data. In other words, though the pixel data stored in the storage device 122 is mainly used for intra prediction, the padding circuit 120 may generate padded pixel data based on the reconstructed pixel data derived from combining the predicted pixel data provided by the motion compensation circuit 118 and the residue data provided through inverse scan circuit 104, inverse quantization circuit 106, and inverse transform circuit 108.

Figure 7:
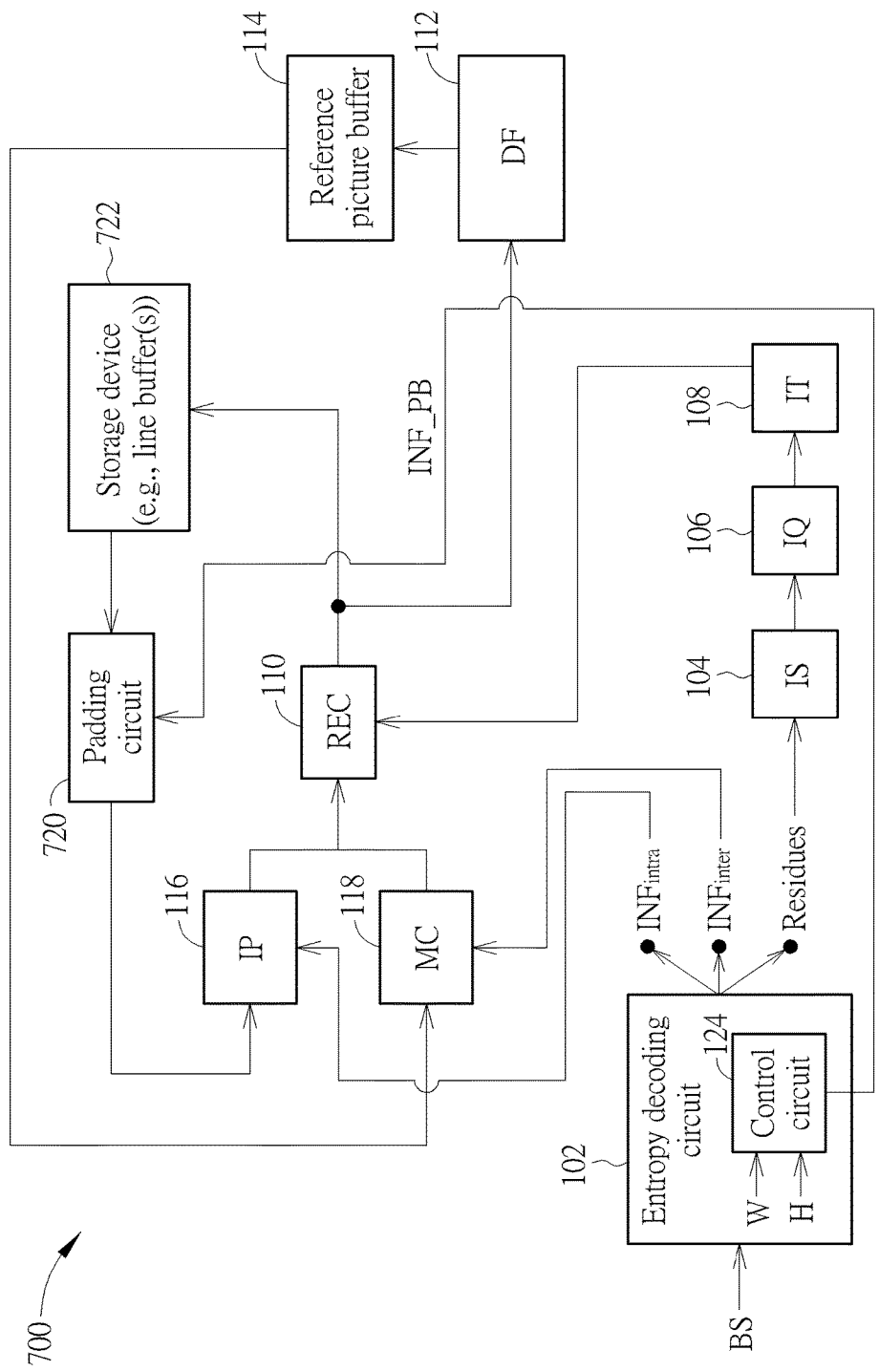
FIG. 7 is a diagram of a third video processing apparatus according to an embodiment of the present invention.

Alternatively, the padding circuit 120 may be moved from the path between the reconstruct circuit 110/510 and the storage device 122 to the path between the intra prediction circuit 116 and the storage device 122. FIG. 7 is a diagram of a third video processing apparatus according to an embodiment of the present invention. The video processing apparatus 700 may be part of an electronic device, such as a personal computer (e.g., a laptop computer or a desktop computer), a mobile phone, a tablet or a wearable device. The video processing apparatus 700 may include at least a portion (i.e., part or all) of a video decoder for decoding a bitstream BS to generate a video sequence composed of a plurality of consecutive decoded pictures (i.e., reconstructed pictures). At least a portion of the video processing apparatus 700 may be implemented in an integrated circuit (IC).

To put it simply, any electronic device or electronic system using the proposed video processing apparatus 700 falls within the scope of the present invention. The major difference between the video processing apparatuses 100 and 700 is the padding circuit design. As shown in FIG. 7, the padding circuit 710 is coupled between a storage device (e.g., line buffer(s)) 722 and the intra prediction circuit 116. Like the storage device 122 mentioned above, the storage device 722 may be implemented using an internal storage device such as an on-chip SRAM. In addition, the capacity of the storage device 722 is smaller than a reconstructed data size of one picture. Hence, during decoding of one picture, at least a portion of pixel data stored in the storage device 722 may be overwritten or discarded. It should be noted that two one-dimensional arrays (which contain the left reconstructed pixels and the above reconstructed pixels belonging to neighbor blocks decoded prior to a current block) may be both stored in the storage device 722 for use in intra prediction of the current block.

The reconstruct circuit 110 stores a portion of the reconstructed pixels of the first block (e.g., the right-most reconstructed pixel column of the transform block 202, or the bottom-most reconstructed pixel row of the transform block 209) into the storage device 722, and the padding circuit 720 selectively performs pixel padding on the portion of the reconstructed pixels of the first block in the storage device 722 according to the picture boundary information INF_PB. When the picture boundary information INF_PB indicates that a second block (e.g., transform block 203 or transform block 205) is across the picture boundary, the padding circuit 710 enables pixel padding to generate padded pixel(s) based on a reconstructed boundary pixel included in the portion of the reconstructed pixels of the first block, and outputs the portion of the reconstructed pixels of the first block read from the storage device 722 and the associated padded pixel(s) generated by pixel padding to the intra prediction circuit 116. When the picture boundary information INF_PB indicates that a second block is fully inside the picture boundary, the padding circuit 710 does not enable pixel padding to generate padded pixel(s) based on a reconstructed boundary pixel included in the portion of the reconstructed pixels of the first block, and outputs the portion of the reconstructed pixels of the first block read from the storage device 722 to the intra prediction circuit 116. Compared to the storage device 122 used in the video processing apparatus 100/500, the storage device 722 used in the video processing apparatus 700 does not need to store any padded pixel data. Specifically, the padding circuit 720 prepares the padded pixel data needed by intra prediction of a block only when the block is being decoded currently. Further, the padding circuit 720 does not need to enable the pixel padding operation when a prediction mode of a current block is an inter prediction mode.

Figure 8:
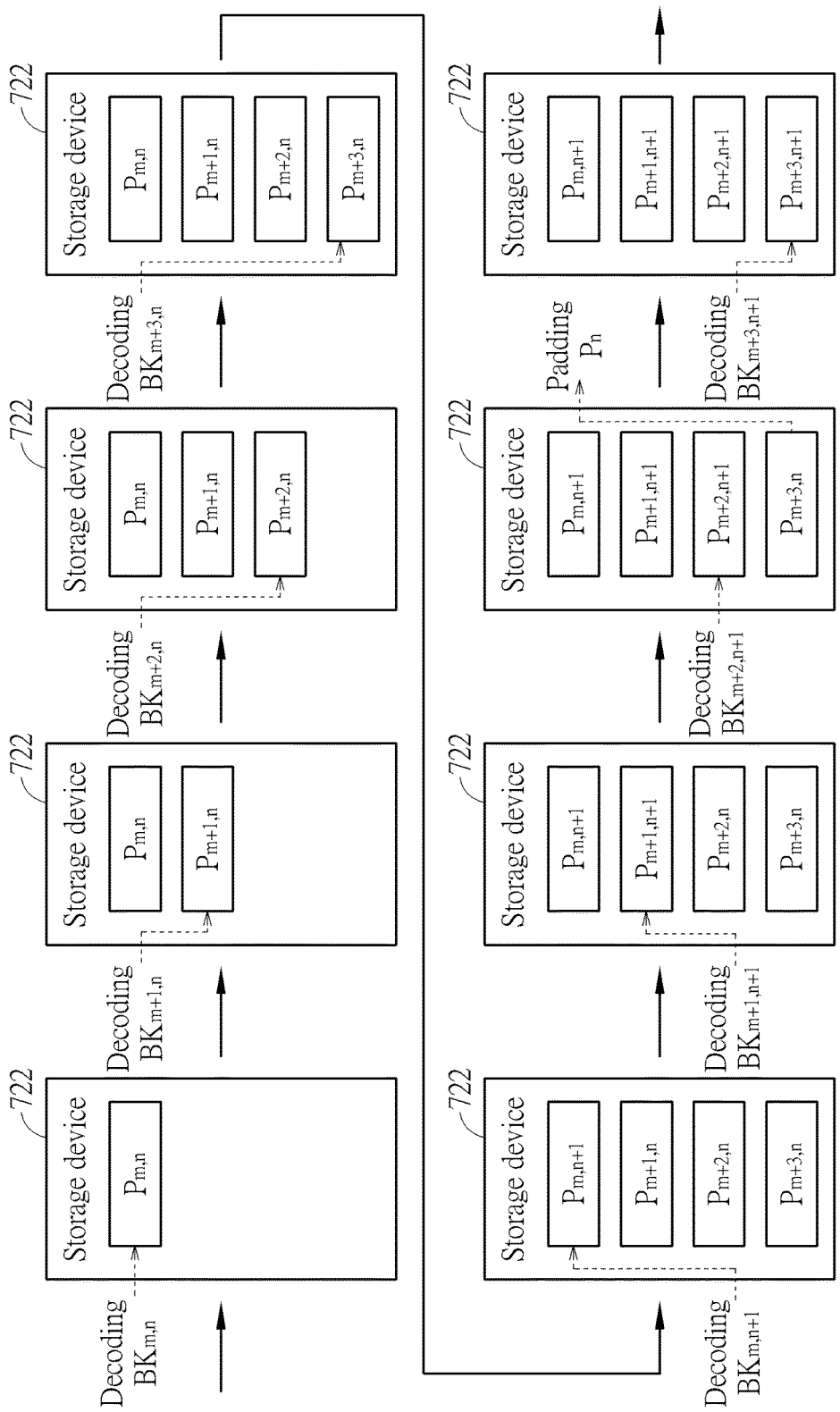
FIG. 8 is a diagram illustrating an example of using a storage device shown in FIG. 7 to store pixel data of reconstructed pixels.

Please refer to FIG. 3 in conjunction with FIG. 8. FIG. 8 is a diagram illustrating an example of using the storage device 722 to store pixel data of reconstructed pixels. A portion of a picture to be decoded by the video processing apparatus 700 may include blocks (e.g., transform blocks) $BK_{m,n}$-$BK_{m+3,n+3}$. With regard to each of the blocks $BK_{m+3,n}$, $BK_{m+3,n+1}$, $BK_{m+3,n+2}$, and $BK_{m+3,n+}$, intra prediction is performed across the picture boundary. Suppose that the blocks $BK_{m,n}$-$BK_{m+3,n+3}$ are decoded in a raster scan order. When decoding of the block $BK_{m,n}$ is complete, the pixel data of the bottom-most reconstructed pixel row $P_{m,n}$ is stored into the storage device 722 since intra prediction of the block $BK_{m,n+1}$ (which is directly below the block $BK_{m,n}$) may need the bottom-most reconstructed pixel row $P_{m,n}$.

Similarly, the pixel data of the bottom-most reconstructed pixel row $P_{m+1,n}$ is stored into the storage device 722 when decoding of the block $BK_{m+1,n}$ is complete, the pixel data of the bottom-most reconstructed pixel row $P_{m+2,n}$ is stored into the storage device 722 when decoding of the block $BK_{m+2,n}$ is complete, and the pixel data of the bottom-most reconstructed pixel row $P_{m+3,n}$ is stored into the storage device 722 when decoding of the block $BK_{m+3,n}$ is complete. It should be noted that the padded pixel row $P_n$ is not generated by the padding circuit 720 at this moment because decoding of the block $BK_{m+3,n+1}$ (which is directly below the block $BK_{m+3,n}$) does not begin yet.

When decoding of the block $BK_{m,n+1}$ begins, the neighbor pixel data needed for intra prediction of the block $BK_{m,n+1}$ is already available in the storage device 722. In this example, the upper one-dimensional array of reconstructed pixel data (i.e., the bottom reconstructed pixel row $P_{m,n}$) can be directly obtained from the storage device 722. When decoding of the block $BK_{m,n+1}$ is complete, the bottom reconstructed pixel row $P_{m,n}$ is no longer needed by any later block to be decoded. Hence, the pixel data of the bottom-most reconstructed pixel row $P_{m,n+1}$ may be stored into the storage device 722 to overwrite the useless bottom reconstructed pixel row $P_{m,n}$, where intra prediction of the block $BK_{m,n+2}$ (which is directly below the block $BK_{m,n+1}$) may need the bottom-most reconstructed pixel row $P_{m,n+1}$. Similarly, the pixel data of the bottom-most reconstructed pixel row $P_{m+1,n+1}$ may be stored into the storage device 722 to overwrite the useless bottom reconstructed pixel row $P_{m+1,n}$ when decoding of the block $BK_{m+1,n+1}$ is complete, and the pixel data of the bottom-most reconstructed pixel row $P_{m+2,n+1}$ may be stored into the storage device 722 to overwrite the useless bottom reconstructed pixel row $P_{m+2,n}$ when decoding of the block $BK_{m+2,n+1}$ is complete.

When decoding of the block $BK_{m+3,n+1}$ begins, the picture boundary information ING_PB generated from the control circuit 124 indicates that the block $BK_{m+3,n+1}$ is across the picture boundary. In a case where the prediction mode of the block $BK_{m+3,n+1}$ is the intra prediction mode, the padding circuit 720 enables pixel padding to generate the padded pixel row $P_n$ based on a right-most reconstructed pixel (i.e., a reconstructed boundary pixel) in the bottom-most reconstructed pixel row $P_{m+3,n}$ stored in the storage device 722, and then outputs the padded pixel row $P_n$ generated by pixel padding and the bottom-most reconstructed pixel row $P_{m+3,n}$ read from the storage device 722 to the intra prediction circuit 116. In another case where the prediction mode of the block $BK_{m+3,n+1}$ is the inter prediction mode, the padding circuit 720 outputs the bottom-most reconstructed pixel row $P_{m+3,n}$ read from the storage device 722 to the intra prediction circuit 116 without enabling the pixel padding function. When decoding of the block $BK_{m+3,n+1}$ is complete, the pixel data of the bottom-most reconstructed pixel row $P_{m+3,n+1}$ is stored into the storage device 722 since intra prediction of the block $BK_{m+3,n+2}$ (which is directly below the block $BK_{m+3,n+1}$) may need the bottom-most reconstructed pixel row $P_{m+3,n+1}$. Further, when decoding of the block $BK_{m+3,n+1}$ is complete, the bottom reconstructed pixel row $P_{m+3,n}$ is no longer needed by any later block to be decoded. Hence, the bottom-most reconstructed pixel row $P_{m+3,n+1}$ may be stored into the storage device 722 to overwrite the useless bottom reconstructed pixel row $P_{m+3,n}$. It should be noted that the padded pixel row $P_{n+1}$ is not generated by the padding circuit 720 at this moment because decoding of the block $BK_{m+3,n+2}$ (which is directly below the block $BK_{m+3,n+1}$) does not begin yet.

As a person skilled in the art can readily understand the operation of using the storage device 722 to store and replace/overwrite reconstructed pixel data used by intra prediction of following blocks after reading above paragraphs, further description is omitted here for brevity.

Figure 9:
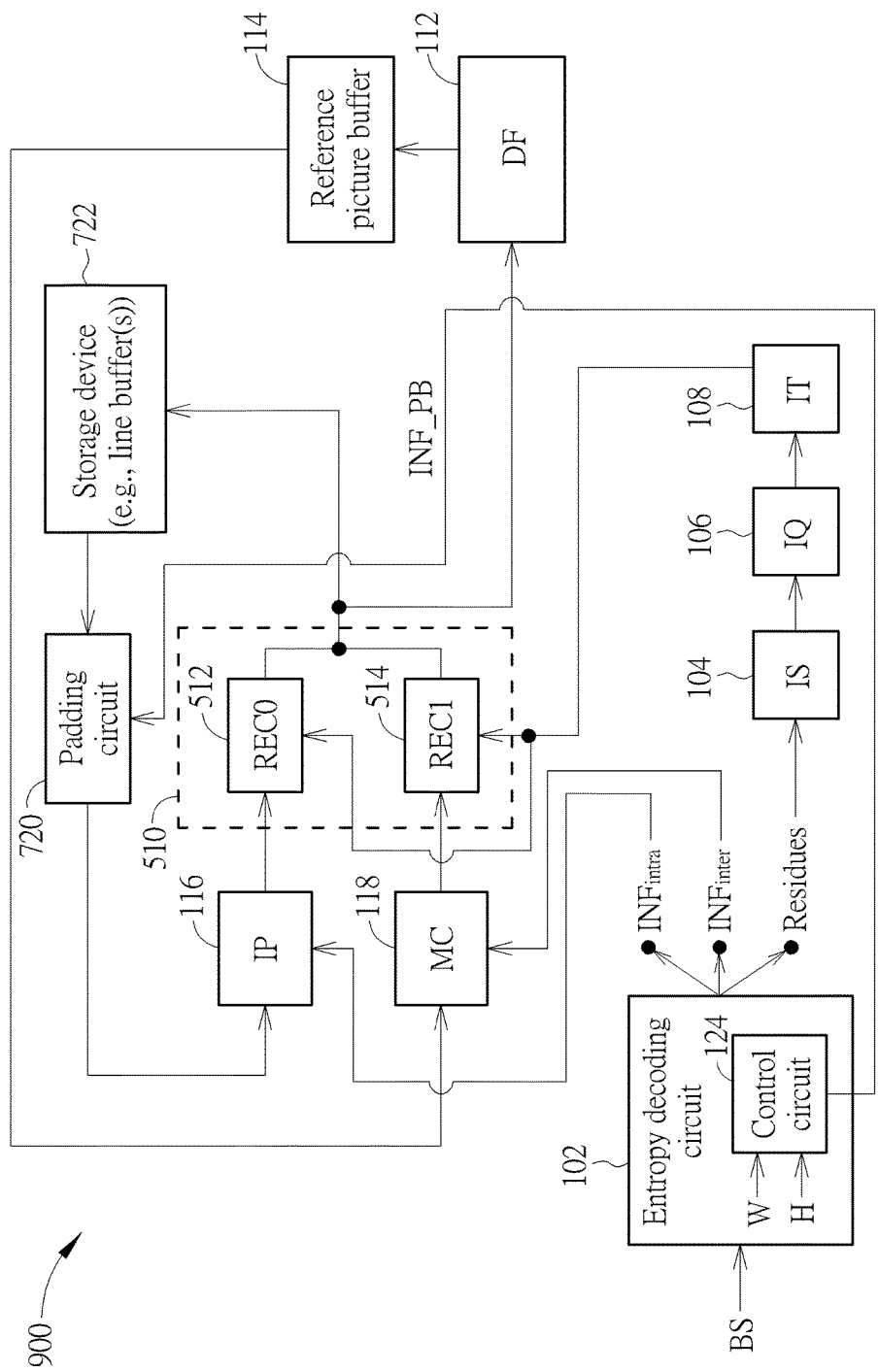
FIG. 9 is a diagram of a fourth video processing apparatus according to an embodiment of the present invention.

FIG. 9 is a diagram of a fourth video processing apparatus according to an embodiment of the present invention. The video processing apparatus 900 may be part of an electronic device, such as a personal computer (e.g., a laptop computer or a desktop computer), a mobile phone, a tablet or a wearable device. The video processing apparatus 900 may include at least a portion (i.e., part or all) of a video decoder for decoding a bitstream BS to generate a video sequence composed of a plurality of consecutive decoded pictures (i.e., reconstructed pictures). At least a portion of the video processing apparatus 900 may be implemented in an integrated circuit (IC). To put it simply, any electronic device or electronic system using the proposed video processing apparatus 900 falls within the scope of the present invention. The major difference between the video processing apparatuses 700 and 900 is the reconstruct circuit design. For example, the video processing apparatus 900 is obtained from the video processing apparatus 700 by replacing the reconstruct circuit 110 used in the video processing apparatus 700 with the aforementioned reconstruct circuit 510. Since a person skilled in the art can readily understand details of the video processing apparatus 900 after reading above paragraphs directed to video processing apparatuses 500 and 700, further description is omitted here for brevity.

Figure 10:
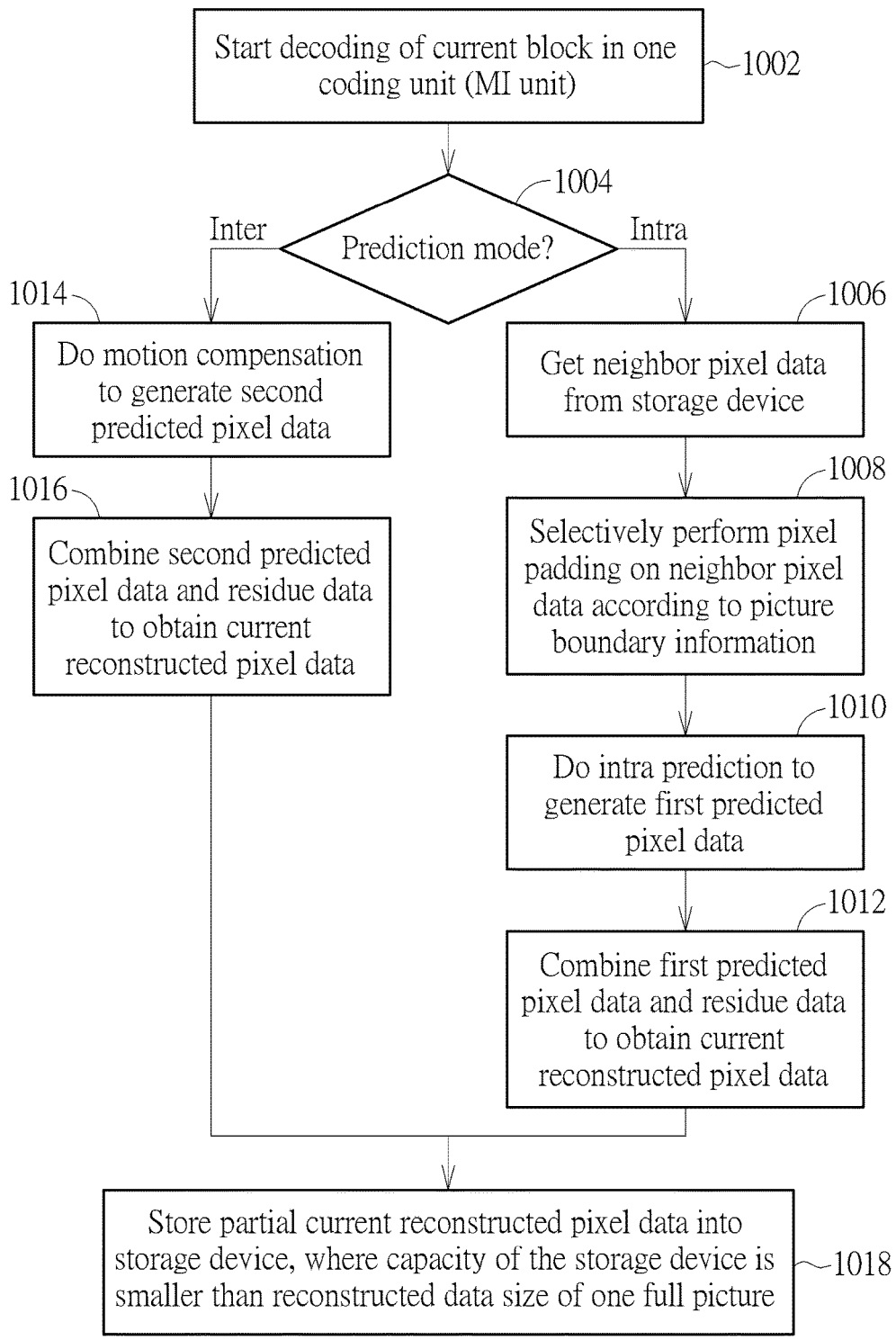
FIG. 10 is a diagram illustrating a second video processing method according to an embodiment of the present invention.

FIG. 10 is a diagram illustrating a second video processing method according to an embodiment of the present invention. Provided that the result is substantially the same, the steps are not required to be executed in the exact order shown in FIG. 10. The video processing method shown in FIG. 10 may be part of a video decoding procedure, and may be employed by any of the video processing apparatuses 700 and 900. The video processing method may be briefly summarized as below.

Step 1002: Start decoding of a current block (e.g., a transform block) in one coding unit (MI unit).

Step 1004: Check a prediction mode of the current block. When the prediction mode of the current block is the intra prediction mode, go to step 1006. When the prediction mode of the current block is the inter prediction mode, go to step 1014.

Step 1006: Get neighbor pixel data from a storage device (e.g., storage device 722).

Step 1008: Selectively perform pixel padding on the neighbor pixel data according to picture boundary information.

Step 1010: Do intra prediction to generate first predicted pixel data.

Step 1012: Combine the first predicted pixel data and residue data to obtain current reconstructed pixel data. Go to step 1018.

Step 1014: Do motion compensation to generate second predicted pixel data.

Step 1016: Combine the second predicted pixel data and the residue data to obtain current reconstructed pixel data.

Step 1018: Store partial current reconstructed pixel data into the storage device (e.g., storage device 722), where a capacity of the storage device is smaller than a reconstructed data size of one full picture.

As a person skilled in the pertinent art should readily understand details of each step in FIG. 10 after reading above paragraphs, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video processing apparatus comprising:
   a reconstruct circuit, arranged to generate reconstructed pixels of a first block of a picture, wherein the reconstructed pixels include a reconstructed boundary pixel on a picture boundary of the picture, and the reconstruct circuit does not provide reconstructed pixels outside the picture boundary of the picture;
   a storage device, arranged to at least store a portion of the reconstructed pixels of the first block, wherein a capacity of the storage device is smaller than a reconstructed data size of the picture, and a full reconstructed picture generated by reconstructing the picture at the reconstruct circuit is not buffered in the storage device;
   an intra prediction circuit, arranged to read pixel data from the storage device and perform intra prediction of a second block of the picture based at least partly on the pixel data read from the storage device; and
   a padding circuit, arranged to generate at least one padded pixel outside the picture boundary, wherein the reconstructed boundary pixel and the at least one padded pixel correspond to a same row of the picture or a same column of the picture;
   wherein the intra prediction circuit performs the intra prediction of the second block of the picture based at least partly on the reconstructed boundary pixel and the at least one padded pixel.

2. The video processing apparatus of claim 1, wherein the padding circuit at least stores the reconstructed boundary pixel and the at least one padded pixel into the storage device; and the intra prediction circuit reads the reconstructed boundary pixel and the at least one padded pixel from the storage device.

3. The video processing apparatus of claim 2, wherein the intra prediction circuit is arranged to generate first predicted pixels of the first block to the reconstruct circuit when the prediction mode of the first block is an intra prediction mode; and the video processing apparatus further comprises:
   a motion compensation circuit, arranged to generate second predicted pixels of the first block to the reconstruct circuit when a prediction mode of the first block is an inter prediction mode;
   wherein the reconstruct circuit is a single reconstruct unit shared between the intra prediction circuit and the motion compensation circuit for selectively performing intra-coded pixel reconstruction based at least partly on the first predicted pixels and performing inter-coded pixel reconstruction based at least partly on the second predicted pixels.

4. The video processing apparatus of claim 2, wherein the intra prediction circuit is arranged to generate first predicted pixels of the first block to the reconstruct circuit when the prediction mode of the first block is an intra prediction mode; and the video processing apparatus further comprises:
   a motion compensation circuit, arranged to generate second predicted pixels of the first block to the reconstruct circuit when a prediction mode of the first block is an inter prediction mode;

wherein the reconstruct circuit comprises:
a first reconstruct unit, coupled to the intra prediction circuit for performing intra-coded pixel reconstruction based at least partly on the first predicted pixels; and
a second reconstruct unit, coupled to the motion compensation circuit for performing inter-coded pixel reconstruction based at least partly on the second predicted pixels.

5. The video processing apparatus of claim 1, wherein the reconstruct circuit at least stores the reconstructed boundary pixel into the storage device; and the padding circuit reads the reconstructed boundary pixel from the storage device, and outputs the reconstructed boundary pixel and the at least one padded pixel to the intra prediction circuit.

6. The video processing apparatus of claim 5, the intra prediction circuit is arranged to generate first predicted pixels of the first block to the reconstruct circuit when the prediction mode of the first block is an intra prediction mode; and the video processing apparatus further comprises:
a motion compensation circuit, arranged to generate second predicted pixels of the first block to the reconstruct circuit when a prediction mode of the first block is an inter prediction mode;
wherein the reconstruct circuit is a single reconstruct unit shared between the intra prediction circuit and the motion compensation circuit for selectively performing intra-coded pixel reconstruction based at least partly on the first predicted pixels and performing inter-coded pixel reconstruction based at least partly on the second predicted pixels.

7. The video processing apparatus of claim 5, wherein the intra prediction circuit is arranged to generate first predicted pixels of the first block to the reconstruct circuit when the prediction mode of the first block is an intra prediction mode; and the video processing apparatus further comprises:
a motion compensation circuit, arranged to generate second predicted pixels of the first block to the reconstruct circuit when a prediction mode of the first block is an inter prediction mode;
wherein the reconstruct circuit comprises:
a first reconstruct unit, coupled to the intra prediction circuit for performing intra-coded pixel reconstruction based at least partly on the first predicted pixels; and
a second reconstruct unit, coupled to the motion compensation circuit for performing inter-coded pixel reconstruction based at least partly on the second predicted pixels.

8. The video processing apparatus of claim 1, further comprising:
a control circuit, arranged to generate picture boundary information according to a width of the picture, a height of the picture, and position-related information of the second block;
wherein the picture boundary information indicates whether the second block is across the picture boundary of the picture; and the padding circuit generates the at least one padded pixel according to the reconstructed boundary pixel and the picture boundary information.

9. The video processing apparatus of claim 1, wherein during decoding of the picture, at least a portion of the pixel data stored in the storage device and referenced for intra prediction is overwritten or discarded.

10. A video processing method comprising:
generating reconstructed pixels of a first block of a picture, wherein the reconstructed pixels include a reconstructed boundary pixel on a picture boundary of the picture, and reconstructed pixels outside the picture boundary of the picture are not provided by pixel reconstruction;
utilizing a storage device to at least store a portion of the reconstructed pixels of the first block, wherein a capacity of the storage device is smaller than a reconstructed data size of the picture, and a full reconstructed picture generated by reconstructing the picture is not buffered in the storage device;
reading pixel data from the storage device, and performing intra prediction of a second block of the picture based at least partly on the pixel data read from the storage device; and
generating at least one padded pixel outside the picture boundary, wherein the reconstructed boundary pixel and the at least one padded pixel correspond to a same row of the picture or a same column of the picture;
wherein performing the intra prediction of the second block comprises:
performing the intra prediction of the second block of the picture based at least partly on the reconstructed boundary pixel and the at least one padded pixel.

11. The video processing method of claim 10, wherein generating the at least one padded pixel outside the picture boundary further comprises:
at least storing the reconstructed boundary pixel and the at least one padded pixel into the storage device; and
performing the intra prediction of the second block of the picture further comprises:
reading the reconstructed boundary pixel and the at least one padded pixel from the storage device.

12. The video processing method of claim 11, wherein when the prediction mode of the first block is an intra prediction mode, the intra prediction is performed to generate first predicted pixels of the first block; and the video processing method further comprises:
when a prediction mode of the first block is an inter prediction mode, performing motion compensation to generate second predicted pixels of the first block;
wherein generating the reconstructed pixels of the first block comprises:
utilizing a single reconstruct unit shared between the intra prediction and the motion compensation for selectively performing intra-coded pixel reconstruction based at least partly on the first predicted pixels and performing inter-coded pixel reconstruction based at least partly on the second predicted pixels.

13. The video processing method of claim 11, wherein when the prediction mode of the first block is an intra prediction mode, the intra prediction is performed to generate first predicted pixels of the first block; and the video processing method further comprises:
when a prediction mode of the first block is an inter prediction mode, performing motion compensation to generate second predicted pixels of the first block;
wherein generating the reconstructed pixels of the first block comprises:
when the prediction mode of the first block is the intra prediction mode, utilizing a first reconstruct unit for performing intra-coded pixel reconstruction based at least partly on the first predicted pixels; and
when the prediction mode of the first block is the inter prediction mode, utilizing a second reconstruct unit for performing inter-coded pixel reconstruction based at least partly on the second predicted pixels.

14. The video processing method of claim 10, wherein generating the reconstructed pixels of the first block further comprises:
- at least storing the reconstructed boundary pixel into the storage device; and generating the at least one padded pixel outside the picture boundary further comprises:
- reading the reconstructed boundary pixel from the storage device, and outputting the reconstructed boundary pixel and the at least one padded pixel for the intra prediction of the second block.

15. The video processing method of claim 14, wherein when the prediction mode of the first block is an intra prediction mode, the intra prediction is performed to generate first predicted pixels of the first block; and the video processing method further comprises:
- when a prediction mode of the first block is an inter prediction mode, performing motion compensation to generate second predicted pixels of the first block;
- wherein generating the reconstructed pixels of the first block comprises:
  - utilizing a single reconstruct unit shared between the intra prediction and the motion compensation for selectively performing intra-coded pixel reconstruction based at least partly on the first predicted pixels and performing inter-coded pixel reconstruction based at least partly on the second predicted pixels.

16. The video processing method of claim 14, wherein when the prediction mode of the first block is an intra prediction mode, the intra prediction is performed to generate first predicted pixels of the first block; and the video processing method further comprises:
- when a prediction mode of the first block is an inter prediction mode, performing motion compensation to generate second predicted pixels of the first block;
- wherein generating the reconstructed pixels of the first block comprises:
  - when the prediction mode of the first block is the intra prediction mode, utilizing a first reconstruct unit for performing intra-coded pixel reconstruction based at least partly on the first predicted pixels; and
  - when the prediction mode of the first block is the inter prediction mode, utilizing a second reconstruct unit for performing inter-coded pixel reconstruction based at least partly on the second predicted pixels.

17. The video processing method of claim 10, further comprising:
- generating picture boundary information according to a width of the picture, a height of the picture, and position-related information of the second block;
- wherein the picture boundary information indicates whether the second block is across the picture boundary of the picture; and generating the at least one padded pixel outside the picture boundary comprises:
  - generating the at least one padded pixel according to the reconstructed boundary pixel and the picture boundary information.

18. The video processing method of claim 10, wherein during decoding of the picture, at least a portion of the pixel data stored in the storage device is overwritten or discarded.

* * * * *